(No Model.)
B. J. WESTERVELT.
CAR WHEEL.
No. 368,262. Patented Aug. 16, 1887.
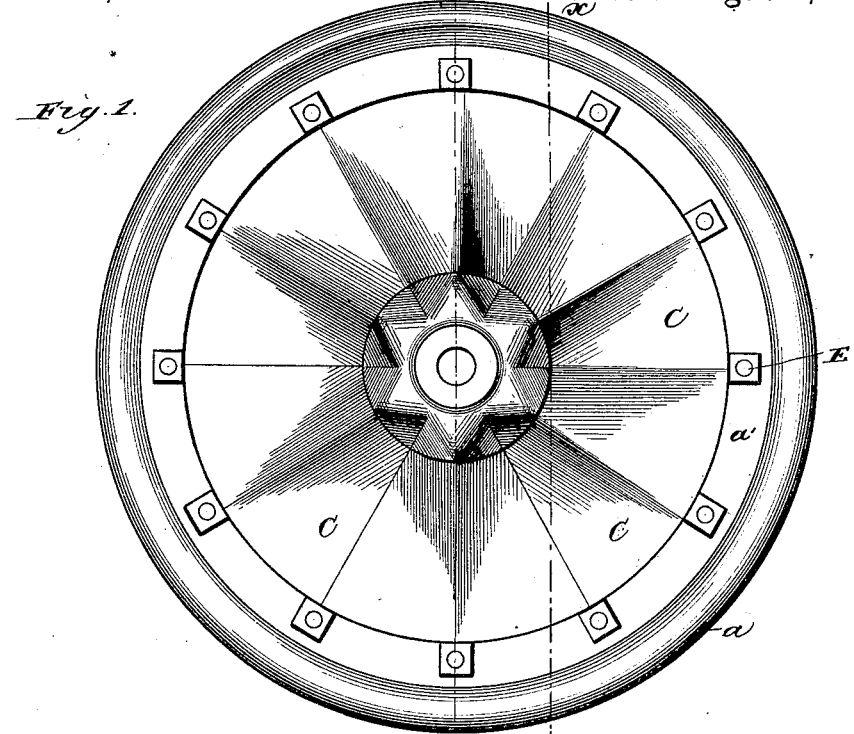
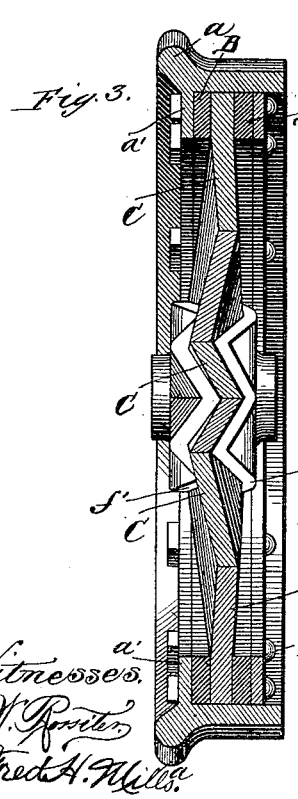
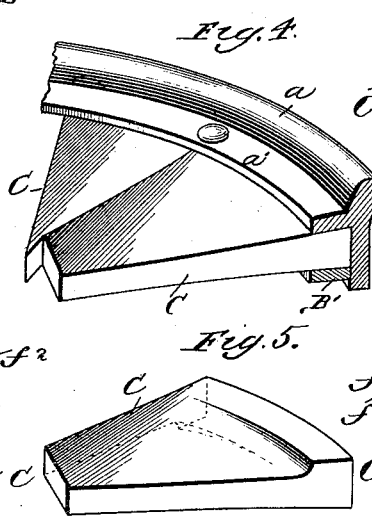
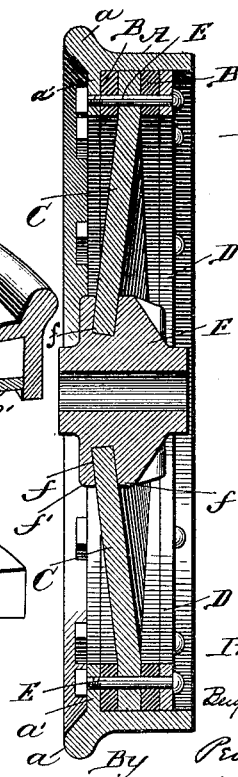

UNITED STATES PATENT OFFICE.

BENJAMIN J. WESTERVELT, OF BUDA, ILLINOIS, ASSIGNOR TO THE BUDA FOUNDRY AND MANUFACTURING COMPANY, OF SAME PLACE.

CAR-WHEEL.

SPECIFICATION forming part of Letters Patent No. 368,262, dated August 16, 1887.

Application filed June 18, 1887. Serial No. 241,710. (No model.)

*To all whom it may concern:*

Be it known that I, BENJAMIN J. WESTERVELT, a citizen of the United States, residing at Buda, in the county of Bureau and State of Illinois, have invented certain new and useful Improvements in Car-Wheels, of which I do declare the following to be a full, clear, and exact description, reference being had to the accompanying drawings, forming part of this specification.

My present invention relates particularly to that class of car-wheels the hubs and tires of which are composed of metal, and the bodies of which are formed of spokes or segments of wood attached to the hubs and tires. In this class of wheels it has been heretofore proposed to form the wooden body of the wheel of spokes or segments having their narrowed inner ends bolted to a flanged hub, and having their expanded outer ends bearing against the inner face of the tire and bolted to an inwardly-projecting flange formed integral with the tire.

The object of my present invention is to improve the construction of this class of wheels, so that greater strength and durability will be given to the wooden body, while the advantage of lightness incident to the use of a wooden body will be retained. This object of invention I have accomplished by setting the inner ends of the wooden spokes or segments obliquely upon the hub; and to this end my invention consists, primarily, in a car-wheel comprising the combination, with the usual or suitable hub and tire, of a body formed of wooden spokes or segments having their inner ends set obliquely upon the hub, and having their inner and outer ends joined, respectively, to the hub and tire.

My invention also consists in the details of construction hereinafter described, illustrated in the accompanying drawings, and particularly defined in the claims at the end of this specification.

Figure 1 is a view in side elevation of a car-wheel embodying my invention. Fig. 2 is a view in vertical section on line $x\,x$ of Fig. 1. Fig. 3 is a view in central vertical section on line $y\,y$ of Fig. 1.

A designates the tire of the wheel provided upon its pheriphery with the usual guard-flange, $a$, and provided also with the usual inwardly-projecting flange, $a'$, to which the body of the wheel will be bolted. Adjacent the inwardly-projecting flange $a'$ of the tire is set a fillet, B, of wood or other suitable material, against which will bear the outer expanded ends of the wooden spokes or segments C, and upon the opposite side of these spokes or segments C will be placed a wooden fillet or band, B, and upon this band is held the retaining-ring D. The outer ends of the wooden spokes or segments C of the wheel-body are firmly fastened to the internal flange, $a$, of the tire by means of the threaded bolts E, which pass through the flange $a'$, the fillets B and B, the spokes C, and the retaining-ring D, and are provided at their outer ends with the jam-nuts $e$, which serve to tightly clamp and hold the parts together. The spokes or segments C, whereof the body of the wheel is composed, are formed of wood with the grain extending in the direction of their length, and each of these spokes is so shaped, either by twisting or by properly shaping them in the process of cutting, that the inner ends, when set upon the hub F, shall extend obliquely to the radial plane thereof. The outer ends of the spokes or segments C are made preferably straight, so as to extend in the radial plane of the wheel and permit the ends to be bolted to the flanged tire in the manner already described—that is to say, the twisting of the body of the spokes is begun at a point shortly beneath the outer ends thereof, and is gradually increased until the inner ends extend at an angle to the plane of the outer ends. The inner ends of the wooden spokes or segments are set within the corrugated groove $f$, that is formed in the periphery of the hub, and the adjacent spokes or segments are by preference arranged in reverse manner with respect to their position on the hub, as more particularly shown in Fig. 2, so that the edges of the spokes or segments shall bear against and firmly brace each other. The corrugated groove $f$ of the hub is formed by the adjacent flanges $f'$ and $f^2$, which are by preference formed integral with the hub, and into this corrugated groove the inner ends of the spokes will be firmly driven.

By forming the spokes or segments C in the manner above described, so that their inner ends shall rest upon the hub of the wheel, I am enabled to give to the body of the wheel without increasing its weight the effect of a very broad bearing about the hub, and moreover, with the edges of the spokes or segments abutting against each other, they serve to form a series of arches or corrugations around the entire body of the hub and avoid all danger of the breakage of the wheel incident to any lateral strain or to any blows which may be given to the wheel in the operation of loading or handling the car. As this class of wheels is particularly designed for use upon hand-cars or push-cars, in which the wheels are often subjected to severe lateral strain and frequently to blows as the car is being loaded or handled, the importance of increasing the strength of the wheel in such manner that the danger of fracture will be avoided is obvious; and it is also plain that as this class of cars must necessarily be of light construction it is a great advantage to obtain the desired strength without materially increasing the weight of the wheel.

I do not wish my invention to be understood as restricted to the precise arrangement of the spokes illustrated in the drawings; nor do I wish my invention to be understood as restricted to the use of a solid hub for retaining the inner ends of the spokes, although I regard this latter construction as more desirable than the use of a flanged hub with a separate retaining-band, as heretofore commonly practiced.

By arranging a fillet of wood or other suitable material upon each side of the outer ends of the spokes I am enabled to bring the periphery of the wheel-body immediately beneath that point of the tire at which the greatest vertical strain will be exerted; but I do not wish my invention to be understood as restricted to this precise method of attaching the body of the wheel to the tire, as my invention can be advantageously practiced without the employment of the fillets B and B, in which case the internal flange, $a$, of the tire will be formed nearer the center and the outer ends of the spokes will be clamped directly thereto by means of the retaining-ring D and bolts E.

It is also obvious that, if desired, the bodies of the spokes or segments C may be of gradually-increasing thickness from the inner to the outer ends, so that their outer ends shall afford a broad bearing beneath the central portion of the tire, as illustrated in Fig. 4 of the drawings, in which case the metallic ring D need only be employed, or, if desired, this ring also may be omitted. In Fig. 5 the spokes or segments C are shown as cut away at $c$ from their inner to their outer ends, so as to lighten the body of the wheel, and, as shown by dotted lines in this figure, the sides of each spoke will be reversely cut away, so that the arches or corrugations will be more marked from the hub to the tire of the wheel and throughout the entire body.

In each of the above-described constructions, however, it is obvious that the advantage of arranging the inner ends of the spokes or segments reversely upon the hub is attained—that is to say, the effect of a broad bearing at the hub is secured—and a series of radial arches or corrugations are formed around the hub, so that any strain upon the body of the wheel in the direction of its axis will be borne by these series of arches, which will enable the spokes to brace each other and to give much greater strength to the body of the wheel than would be possible if the inner ends of the spokes were set around the hub in a radial plane, in which latter construction the strain upon each spoke would not be distributed upon the adjoining spokes, but would be thrown directly and entirely upon the flanges of the hub.

In forming the construction of spokes illustrated in Figs. 3 and 4 of the drawings, I prefer to first form the wooden spokes or segments of uniform thickness and afterward to cut away each side, so that at the inner ends of these segments the distance between the points $c'$ and $c^2$ will be equal to the thickness of the body of the spokes, and in this way I am enabled to secure the benefit of the broad bearing at the outer ends of the spokes as well as obtain the proper shape for the inner ends to fit within the corrugations of the hub.

Having thus described my invention, what I claim as new, and desire to secure by Letters Patent, is—

1. In a car-wheel, the combination, with the hub and the tire, of the body comprising wooden spokes or segments having their inner ends set obliquely upon the hub, substantially as described.

2. In a car-wheel, the combination, with the hub and the tire, of the body comprising wooden spokes having narrow inner ends set obliquely upon the hub and broad outer ends bolted to the tire, the adjoining spokes being reversely arranged with their edges abutting, substantially as described.

3. A car-wheel comprising a metal hub having a corrugated groove around its periphery, a metal tire having an inner and outer flange, and a wooden body formed of spokes having their inner ends reversely arranged within the groove of the hub, and having their outer ends unreduced adjacent the flange of the tire, substantially as described.

BENJAMIN J. WESTERVELT.

Witnesses:
F. A. INGALLS,
CHAS. E. SHEPARD.